(12) United States Patent
Strandell et al.

(10) Patent No.: US 8,562,767 B2
(45) Date of Patent: Oct. 22, 2013

(54) METHOD OF HEAT TREATING A STEEL BEARING COMPONENT

(75) Inventors: Ingemar Strandell, Sävedalen (SE); Peter Neuman, Göteborg (SE); Berndt Mikael Sundqvist, Göteborg (SE); Steven Lane, Houten (NL)

(73) Assignee: Aktiebolaget SKF, Göteborg (SE)

( * ) Notice: Subject to any disclaimer, the term of this patent is extended or adjusted under 35 U.S.C. 154(b) by 473 days.

(21) Appl. No.: 12/681,765

(22) PCT Filed: Oct. 3, 2008

(86) PCT No.: PCT/SE2008/000545
§ 371 (c)(1),
(2), (4) Date: Jul. 27, 2010

(87) PCT Pub. No.: WO2009/045147
PCT Pub. Date: Apr. 9, 2009

(65) Prior Publication Data
US 2010/0296764 A1  Nov. 25, 2010

(30) Foreign Application Priority Data
Oct. 4, 2007  (GB) .................................. 0719456.6

(51) Int. Cl.
*C21D 9/40* (2006.01)
*C21D 1/10* (2006.01)
(52) U.S. Cl.
USPC ........... 148/571; 148/567; 148/575; 148/644; 148/639; 148/906; 148/902; 148/903

(58) Field of Classification Search
USPC ......... 158/567, 575, 906, 902, 903, 639, 644, 158/571
See application file for complete search history.

(56) References Cited

U.S. PATENT DOCUMENTS

| | | |
|---|---|---|
| 3,117,041 A | 1/1964 | Koistinen |
| 4,023,988 A | 5/1977 | Stickels et al. |
| 4,180,421 A * | 12/1979 | Joseph et al. ................ 148/572 |
| 5,851,313 A | 12/1998 | Milam |
| 5,853,660 A | 12/1998 | Murakami et al. |
| 6,149,743 A * | 11/2000 | Lund et al. .................... 148/579 |
| 6,203,634 B1 | 3/2001 | Volkmuth |
| 7,104,697 B2 | 9/2006 | Toda et al. |
| 2008/0247900 A1 * | 10/2008 | Hayashi et al. ................ 420/84 |

FOREIGN PATENT DOCUMENTS

| | | |
|---|---|---|
| CA | 1088579 A2 | 10/1980 |
| GB | 2232684 A | 12/1990 |

* cited by examiner

*Primary Examiner* — Deborah Yee
(74) *Attorney, Agent, or Firm* — Bryan Peckjian; SKF USA Patent Group

(57) ABSTRACT

A bearing component formed from a bearing steel, wherein the component has an outer surface and comprises through-hardened bainite and/or martensite and has a substantially homogeneous chemical composition, at least a part of the bearing component having a compressive residual stress profile comprising −25 to −1000 MPa at the near surface, wherein the near surface is defined as a region 500 microns or less below the outer surface.

26 Claims, 5 Drawing Sheets

METHOD OF HEAT TREATING A STEEL BEARING COMPONENT

BACKGROUND OF THE INVENTION

The present invention relates generally to the field of metallurgy and to a bearing component such as a rolling element or ring formed from a bearing steel. A heat-treatment induces a compressive residual stress (CRS) in a surface region of the bearing steel with the corollary of an improvement in mechanical properties, for example rolling contact fatigue performance.

Bearings are devices that permit constrained relative motion between two parts. Rolling element bearings comprise inner and outer raceways and a plurality of rolling elements (ball bearings or roller bearings). For long-term reliability and performance it is important that the various elements have a high resistance to rolling fatigue, wear and creep.

Conventional techniques for manufacturing metal components involve hot-rolling or hot-forging to form a bar, rod, tube or ring, followed by a soft forming process to obtain the desired component. Surface hardening processes are well known and are used to locally increase the hardness of surfaces of finished components so as to improve, for example, wear resistance and fatigue resistance.

A number of surface hardening processes are known for improving rolling contact fatigue performance. Shot peening involves bombarding the surface of the metal component with rounded shot to locally harden surface layers. However, this process results in a rough surface finish which can create other problems and therefore additional steps need to be taken to improve the surface finish. This adds to productions costs.

Case-hardening may also be achieved by heating the steel component in a carbonaceous medium to increase the carbon content, followed by quenching and tempering. This thermochemcial process is known as carburizing and results in a surface chemistry that is quite different from that of the core of the component. Alternatively, the hard surface layer may be formed by rapidly heating the surface of a medium/high carbon steel to above the ferrite/austenite transformation temperature, followed by quenching and tempering to result in a hard surface layer. Heating of the surface has traditionally been achieved by flame hardening, although laser surface-hardening and induction hardening are now often used. Induction hardening involves heating the steel component by exposing it to an alternating magnetic field to a temperature within or above the transformation range, followed by quenching. Heating occurs primarily in the surface of the component, with the core of the component remaining essentially unaffected. The penetration of the field is inversely proportional to the frequency of the field and thus the depth of the hardening can be adjusted in a simple manner. The penetration of the field also depends on the power density and interaction time.

An alternative to case-hardening is through-hardening. Through-hardened components differ from case-hardened components in that the hardness is uniform or substantially uniform throughout the component. Through-hardened components are also generally cheaper to manufacture than case-hardened components because they avoid the complex heat-treatments associated with carburizing, for example.

The steel grades that are used depend on the component section thickness. For components having a wall thickness of up to about 20 mm, DIN 100Cr6 is typically used. For larger section sizes, higher alloyed grades are used such as for example, DIN 100CrMo7-3, DIN 100CrMnMo7, DIN 100CrMo7-4, or DIN 100CrMnMo8.

For through-hardened bearing steel components, two heat-treating methods are available: martensite hardening or austempering. Component properties such as toughness, hardness, microstructure, retained austenite content, and dimensional stability are associated with or affected by the particular type of heat treatment employed.

The martensite through-hardening process involves austenitising the steel prior to quenching below the martensite start temperature. The steel may then be low-temperature tempered to stabilize the microstructure. The martensite through-hardening process typically results in a compressive residual stress (CRS) of from 0 to +100 MPa between the WCS (working contact surface) and down to an approximately 1.5 mm depth below the WCS.

The bainite through-hardening process involves austenitising the steel prior to quenching above the martensite start temperature. Following quenching, an isothermal bainite transformation is performed. Bainite through-hardening is sometimes preferred in steels instead of martensite through-hardening. This is because a bainitic structure may possess superior mechanical properties, for example toughness and crack propagation resistance. The bainite though-hardening process results in a CRS of from 0 to −100 MPa between the WCS and down to an approximately 1.5 mm depth below the WCS.

Numerous conventional heat-treatments are known for achieving martensite through-hardening and bainite through-hardening.

U.S. Pat. No. 5,853,660 relates to a bearing steel consisting of 0.70 to 0.93 wt % of C, 0.15 to 0.50 wt % of Si, 0.50 to 1.10 wt % of Mn and 0.3 to 0.65 wt % of Cr, and the balance Fe, wherein the ratio of Cr to C is 0.4 to 0.7.

U.S. Pat. No. 4,023,988 relates to methods of improving the rolling contact fatigue life for metallic bearing components, particularly chromium steel components designated commercially as SAE 52100 (carbon 0.98-1.1%, manganese 0.25-0.450, 0.025 maximum for each of phosphorous and sulphur, 0.2-0.35% silicon and 1.3-1.6% chromium).

U.S. Pat. No. 5,851,313 relates to a case-hardened stainless steel bearing component and method of manufacturing the bearing.

U.S. Pat. No. 6,203,634 relates to a method for heat-treating through hardened bearing steel components.

U.S. Pat. No. 6,149,743 relates to a method for complete bainite hardening of steel for use in bearings and other load carrying components.

SUMMARY OF THE INVENTION

The present invention aims to address at least some of the problems associated with the prior art.

Accordingly, in a first aspect the present invention provides a bearing component formed from a bearing steel, wherein the component has an outer surface and comprises through-hardened bainite and/or martensite and has a substantially homogeneous chemical composition, at least a part of the bearing component having a compressive residual stress profile comprising −25 to −1000 MPa at the near surface.

The near surface may be defined as a region 500 microns or less below the outer surface, for example a region in the range of from 50 to 500 microns below the outer surface. More preferably, the near surface is 300 microns or less below the outer surface, for example a region in the range of from 50 to 300 microns below the outer surface.

If the bearing component comprises through-hardened bainite as the predominant phase, then the compressive residual stress profile preferably comprises −100 to −900 MPa at the near surface. More preferably, the compressive residual stress profile comprises −200 to −900 MPa at the near surface. More preferably, the compressive residual stress profile comprises −250 to −900 MPa at the near surface.

More preferably, the compressive residual stress profile comprises −300 to −900 MPa at the near surface. Still more preferably, the compressive residual stress profile comprises −300 to −800 MPa at the near surface. The bainite is preferably present in an amount of at least 50 vol. %, more preferably at least 75 vol. %.

Preferably, the compressive residual stress profile further comprises −100 to −500 MPa at from 0.5 to 1 mm depth below the outer surface. More preferably, the compressive residual stress profile comprises −200 to −400 MPa at from 0.5 to 1 mm depth below the outer surface.

If the bearing component comprises through-hardened martensite as the predominant phase, then the compressive residual stress profile preferably comprises −25 to −700 MPa at the near surface. More preferably, the compressive residual stress profile comprises −50 to −700 MPa at the near surface. More preferably, the compressive residual stress profile comprises −75 to −700 MPa at the near surface. More preferably, the compressive residual stress profile comprises −100 to −700 MPa at the near surface. Still more preferably, the compressive residual stress profile comprises −150 to −700 MPa at the near surface. The martensite is preferably present in an amount of at least 50 vol. %, more preferably at least 75 vol. %.

Again, the compressive residual stress profile preferably further comprises −100 to −500 MPa at from 0.5 to 1 mm depth below the outer surface. More preferably, the compressive residual stress profile comprises −200 to −400 MPa at from 0.5 to 1 mm depth below the outer surface.

The bearing component may, for example, be one or more of a rolling element, an inner ring and an outer ring.

In a second aspect the present invention provides a process for inducing a compressive residual stress in a surface region of a steel component, the process comprising a heat-treatment having the following steps:
(i) providing a component comprising a steel composition;
(ii) induction heating at least a part of the component followed by quenching said at least part, wherein the hardness in a surface region of the component is increased; and
(iii) subsequently performing a martensite and/or bainite through-hardening step to obtain a microstructure comprising martensite and/or bainite.

During the induction heating, said at least part of the component is preferably heated to a depth of from 0.5 to 3 mm, more preferably from 0.75 to 2.5 mm, still more preferably from 1 to 2 mm. That is the induction heating preferably penetrates to a depth of at least about 0.5 mm and up to a maximum depth of up to about 3 mm. Induction heating to such depths, in conjunction with the other steps of the process, has been found to induce a compressive residual stress (CRS) in a surface region of the component with the corollary of an improvement in mechanical properties, for example fatigue performance.

During the induction heating, the surface of said at least part of the component preferably reaches a temperature of from 1000 to 1100° C., more preferably from 1020 to 1080° C. After quenching, the surface microstructure comprises martensite or at least martensite as the predominant phase. The martensite is preferably present in an amount of at least 50 vol. %, more preferably at least 75 vol. % of the surface microstructure.

The process may further comprising, after step (iii): (iv) induction heating at least a part of the component followed by quenching said at least part of the component, wherein the hardness in a surface region of the component is increased.

In a third aspect the present invention provides a process for inducing a compressive residual stress in a surface region of a steel component, the process comprising a heat-treatment having the following steps:
(a) providing a component comprising a steel composition;
(b) performing a martensite and/or bainite through-hardening step to obtain a microstructure comprising martensite and/or bainite.
(c) induction heating at least a part of the component followed by quenching said at least part of the component, wherein the hardness in a surface region of the component is increased.

In the third aspect, during the induction heating, said at least part of the component is preferably heated to a depth of from 1 to 6 mm, more preferably from 2 to 5 mm.

In the third aspect, during the induction heating, the surface of said at least part of the component preferably reaches a temperature of from 900 to 1000° C., more preferably from 920 to 980° C. After quenching, the surface microstructure comprises martensite or at least martensite as the predominant phase. The martensite is preferably present in an amount of at least 50 vol. %, more preferably at least 75 vol. % of the surface microstructure. Such a microstructure is advantageous particularly if step (b) comprises a bainite through-hardening step. In such a case, the steel component comprises a bainite core (bainite as the predominant phase; the bainite is preferably present in an amount of at least 50 vol. %, more preferably at least 75 vol. %) and a martensite surface (martensite as the predominant phase). This results in increased thermal strains between the surface and the core.

In the third aspect, following the induction heating and the quenching, the component is preferably subjected to tempering, preferably low temperature tempering at a temperature of up to about 250° C.

The component is preferably a component for a bearing, for example a raceway and/or a rolling element. Accordingly, the process according to the second and/or third aspects is preferably used to produce the product according to the first aspect of the present invention.

The present invention will now be further described. In the following passages different aspects/embodiments of the invention are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

The present invention involves either pre- or post-induction processing in relation to a through-hardening heat-treatment process in order to introduce thermal strains and/or phase transformation strains such that a large compressive residual stress (CRS) is achieved. In particular, the present invention enables a bearing product to be produced with a CRS preferably in the range of −200 to −900 MPa at the near surface, typically being maintained at −300 to −500 MPa at 1 mm depth below the surface. The near surface is typically less than 500 microns below the heat-treated surface. The CRS is superior to conventional bearing components.

The process is applicable to all though-hardening bearing steel grades. The steel will typically be a medium (0.3 to 0.8% carbon) or high carbon steel (>0.8% carbon) such as a high carbon chromium steel or a low alloy bearing steel. For example, 0.65-1.20 wt. % C, 0.05-1.70 wt. % Si, 1.1-2.2 wt. % Cr, 0.10-0.1.10 wt. % Mn, 0.02-1.0 wt. % Ni, 0.02-0.70 wt. % Mo, and the balance Fe, together with any unavoidable impurities. Suitable commercial examples include: DIN 100Cr6 (=SAE 52100), DIN 100CrMo7-3, DIN 100CrMnMo7, DIN 100CrMo7-4, and DIN 100CrMnMo8.

The induction heating is preferably medium and/or high frequency induction heating and is advantageously performed at a frequency of from 2-100 kHz. The interaction time and power level may be varied having regard to the component size and desired depth.

The inducting heating is preferably followed by quenching, for example to room temperature (20 to 25° C.) or even to 0° C. or less.

In the second aspect, the induction heating step advantageously achieves rapid surface heating using medium and/or high frequency induction heating (preferably at a frequency of 2-100 kHz, more preferably 5 to 20 kHz) to a depth of typically 0.5 to 3 mm, more typically 1 to 2 mm.

The surface preferably reaches a temperature of from 1000 to 1100° C., more preferably from 1020 to 1080° C. As noted above, after the induction heating, the component is preferably quenched using, for example, oil or a polymer solution in order to 'freeze' the effect of the surface conditioning.

In the third aspect, the induction heating step advantageously achieves rapid surface heating using medium or high frequency induction heating (preferably at a frequency of 2-100 kHz, more preferably 40 to 130 kHz) to a depth of typically 1 to 6 mm, more typically 2 to 5 mm. The surface preferably reaches a temperature of from 900 to 1000° C., more preferably from 920 to 980° C. As noted above, after the induction heating, the component is preferably quenched using, for example, oil or a polymer solution in order to 'freeze' the effect of the surface conditioning.

If the process of either the second or third aspects involves a martensite through-hardening step, then conventional processes may be relied on. For example, the martensite through-hardening step will typically comprise austenitising the steel and subsequently quenching the steel below the martensite start temperature (Ms is typically 180 to 220° C., more typically 190 to 200° C., still more typically approximately 200° C.). Quenching may be performed using, for example, molten salt. Following the martensite through-hardening step, the component is preferably post-quenched in, for example, cold water to promote further austenite to martensite transformation. Following the post-quench, the component is preferably subjected to low temperature tempering to stabilize the microstructure.

Similarly, if the process involves a bainite through-hardening step, then conventional processes may be relied on. For example, the bainite through-hardening step will typically comprise austenitising the steel and quenching the steel above the martensite start temperature (Ms is typically 180 to 220° C., more typically 190 to 200° C., still more typically approximately 200° C.). Quenching may be performed using, for example, oil or molten salt. This is followed by an isothermal bainite transformation, which is preferably performed at a temperature in the range of from 200 to 250° C., more preferably from 210 to 240° C. The steel is preferably held within this temperature range for from 1 to 30 hours, more preferably from 2.5 to 20 hours depending on the steel grade and section thickness.

Irrespective of whether one or both of martensite and/or bainite are desired, the steel is preferably austenitised (prior to the quench below/above the martensite start temperature). Austenitising is well known in the art. However, the inventors have found (particularly in relation to the first aspect) that applying through-hardening using a 10-50° C. lower hardening temperature than what would normally be used (e.g. 840 to 890° C.) further promotes the CRS build-up. This is believed to be because the core is under-austenitised in relation to the slightly over-austenitised surface portion. Therefore, the phase transformation differences will be more pronounced. The benefit of having a delayed phase transformation in the surface portion is that it will take place on a fully or partially transformed core, which will restrict the possibility for plastic deformation (phase transformations usually involve a volume increase), and the final surface stress state will therefore become compressive. For these reasons, austenitising is preferably performed at a temperature in the range of from 790 to 890° C., more preferably from 790 to 880° C., still more preferably from 790 to 840° C. The steel is preferably held within this temperature range for from 10 to 70 minutes, more preferably from 20 to 60 minutes.

The austenitisation is typically performed in an atmosphere furnace where the component can reach a homogeneous temperature throughout its cross-section. Consequently, a homogenous austenitisation and cementite dissolution is advantageously achieved.

In the present invention the chemical composition of the steel remains essentially unchanged. In other words, the process does not need to involve a thermochemical enrichment process. This is in contrast conventional case-hardening treatments.

The final microstructure comprises either (tempered) martensite or bainite as the major phase or a combination of the two. Cementite may also be present. In general, the microstructure appears to be essentially homogeneous from the surface to the core. However, some inherent segregation of alloying elements (e.g. N, C, Cr, Si, Mn) may be present.

The hardness within the surface is typically 50-75 HRC, more typically 56-68 HRC. The retained austenite content is typically 0-30%.

The underlying core also comprises either martensite and/or bainite or mixtures thereof. The hardness of the core microstructure is typically greater than 50 HRC, more typically greater than 56 HRC. The hardness of the core generally does not exceed 67 HRC, more typically it does not exceed 64 HRC. The retained austenite content is typically 0-20%.

In the third aspect of the present invention, the heat-treatment steps result in a transition zone visible both in hardness and in microstructure.

The present invention enables a bearing product to be produced with a CRS preferably in the range of −200 to −900 MPa at the near surface, being maintained at −300 to −500 MPa at 1 mm depth below the surface. Such a CRS profile compares very favourably to conventional bearing components.

In a fourth aspect, the present invention provides a process involving a combination of the second and third aspects. Here, a first induction heating step, corresponding to the second aspect, introduces mainly a carbide dissolution gradient that affects the phase transformation characteristics. This is followed by martensite and/or bainite though-hardening. Next, a second induction heating step, corresponding to the third aspect, is performed to introduce thermal strains between the surface and the core.

For bearings operating at elevated temperatures, higher interference fits are required in order to keep the rings fixed on the shafts. Because higher interference fits result in large hoop stresses, the risk for through cracking increases. Because structural stresses and mounting stresses, such as hoop stresses, are superimposed on microstructure stresses, a through crack can be catastrophic. Large CRS therefore give the possibility to mount bearings with high interference fits with relatively low risk of through cracking. Even if through cracking occurs, the CRS have a crack-closing effect, i.e. a safe-failure mode.

BRIEF DESCRIPTION OF THE SEVERAL VIEWS OF THE DRAWINGS The present invention will now be described further with reference to the following Examples and the accompanying drawings, provided by way of example, in which.

DETAILED DESCRIPTION OF THE INVENTION

EXAMPLE 1

Pre-processing and Bainite Rehardening

Test component: Spherical roller bearing (SRB) outer ring with OD 180 mm formed from 100Cr6 steel.

Pre-processing: Inductive surface heating using ~10 kHz to reach a surface temperature of ~1050° C. and a pre-processing depth of ~2 mm, followed by quenching using a 5% Aquaquench polymer solution.

Bainite-through hardening: Furnace rehardening using 820° C. and 20 minute soaking time, followed by quenching and transformation in ~230° C. molten Petrofer AS140 salt for 240 minutes, followed by cooling in still air.

Figure 1:
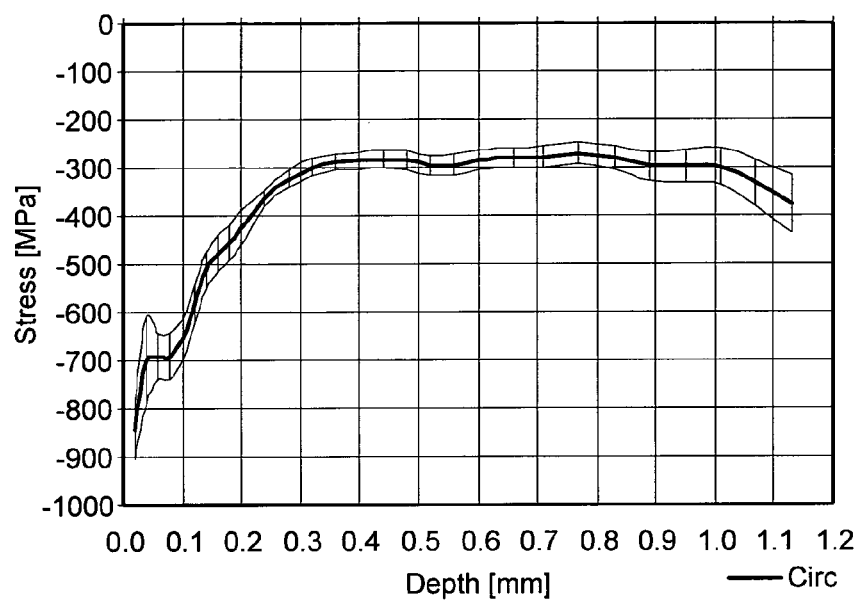
FIG. 1 is a plot showing the compressive residual stress profile for the component of Example 1.

FIG. 1 is a plot showing the compressive residual stress profile for the component of Example 1. The plot shows a near surface CRS of −300 to −800 MPa. The CRS is maintained at −300 down to at least 1.2 mm.

Figure 2A:
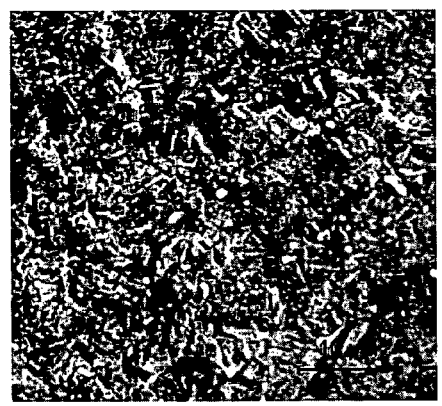
FIGS. 2a and 2b are micrographs showing the surface (a) and core (b) microstructures for the component of Example 1.
Figure 2B:

FIGS. 2a and 2b are micrographs showing the surface (a) and core (b) microstructures for the component of Example 1. The micrographs show a bainite microstructure. The surface microstructure is slightly coarser with less residual carbides (cementite) than the core.

Figure 3:
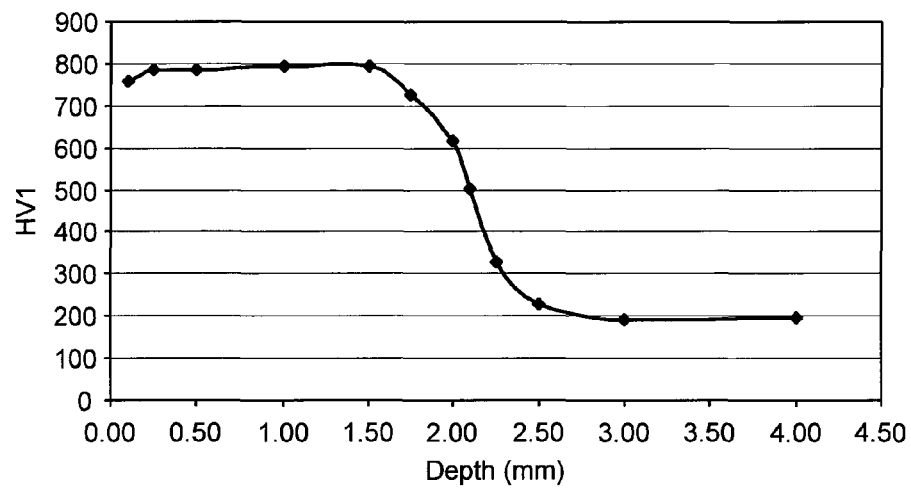
FIG. 3 is a plot showing the hardness profile for the component of Example 1 after the induction heating step but before the bainite through-hardening step.
Figure 4:
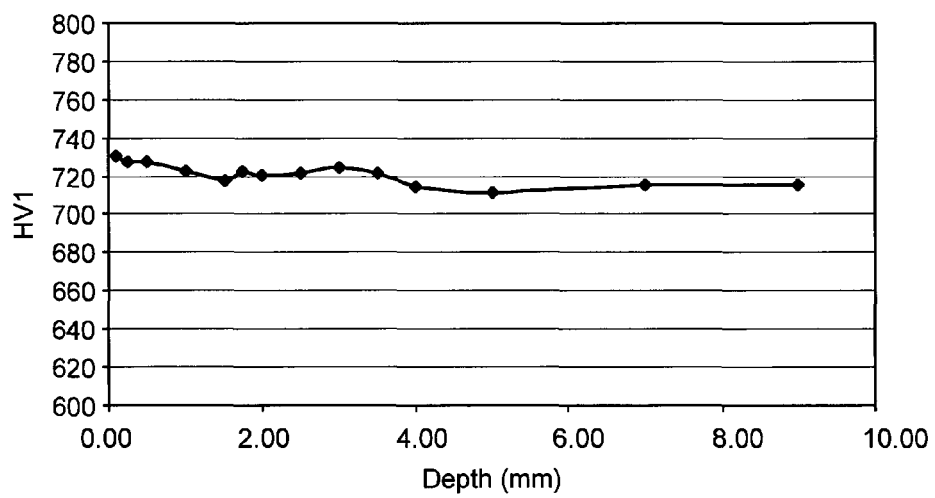
FIG. 4 is a plot showing the hardness profile for the component of Example 1 after the induction heating and bainite through-hardening steps.

FIG. 3 is a plot showing the hardness profile for the component of Example 1 after pre-induction process only FIG. 4 is a plot showing the hardness profile for the component of Example 1 after the complete process.

EXAMPLE 2

Bainite through Hardening and Post-Processing

Test component: Cylindrical roller bearing (CRE) inner ring with OD 120 mm formed from 100Cr6 steel Bainite through-hardening: Furnace rehardening using 860° C. and 20 min soaking time, followed by quenching and transformation in ~230° C. molten Petrofer AS140 salt for 240 min, followed by cooling in still air.

Figure 5:
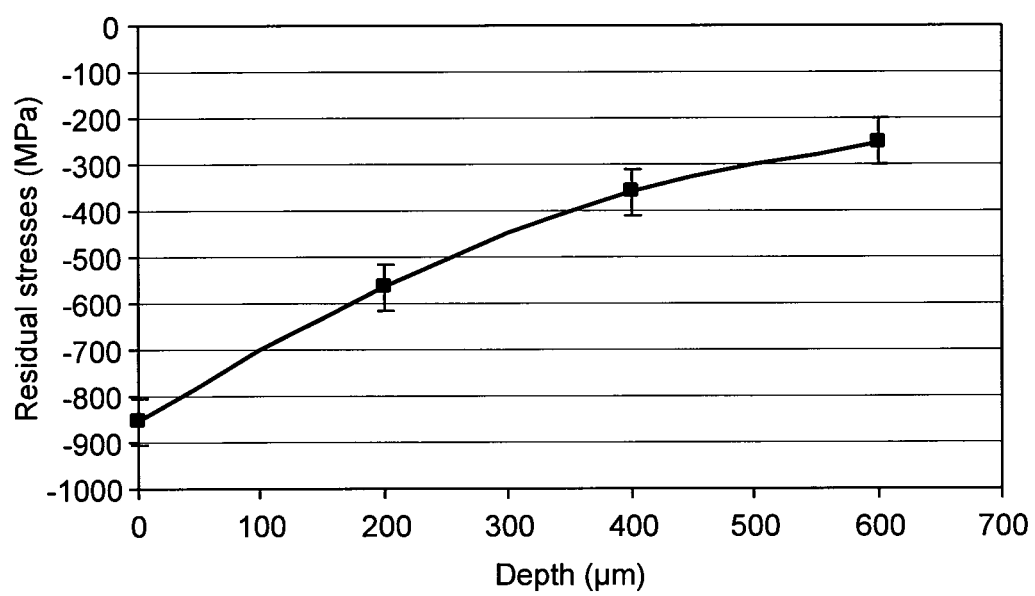
FIG. 5 is a plot showing the compressive residual stress profile for the component of Example 2 after the heat-treatment and compared to standard martensite and standard bainite.

Post-processing: Inductive surface heating using ~8 kHz to reach a surface temperature of ~940° C. and a case depth of ~1.8 mm, followed by quenching using a 5% Aquatensid polymer quench solution and tempering at 160° C. for 60 min FIG. 5 is a plot showing the compressive residual stress profile for the component of Example 2 after the heat-treatment and compared to standard martensite and standard bainite.

Figure 6A:
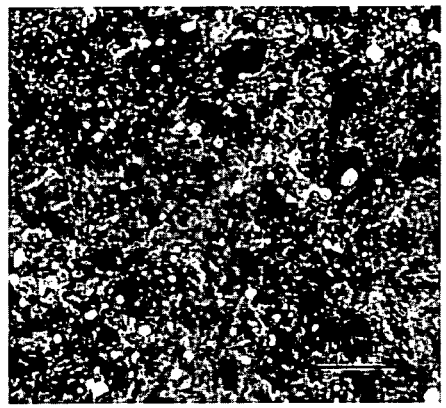
FIGS. 6a, 6b and 6c are micrographs showing the surface (a), transitional zone (b), and core (c) microstructures for the component of Example 2 after the bainite through-hardening and induction heating steps.
Figure 6B:
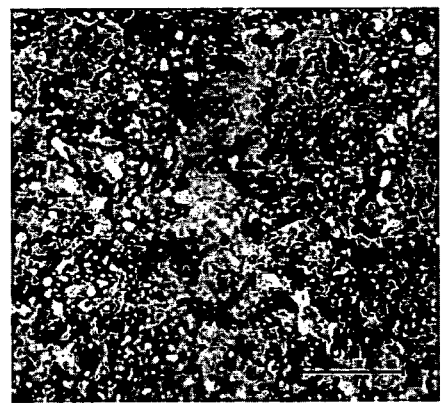
Figure 6C:

FIGS. 6a, 6b and 6c are micrographs showing the surface (a), transitional zone (b), and core (c) microstructures for the component of Example 2 after the bainite through-hardening and induction heating steps. The micrographs show a martensite surface microstructure, a tempered bainite microstructure in the transition zone, and a bainite core microstructure.

Figure 7:
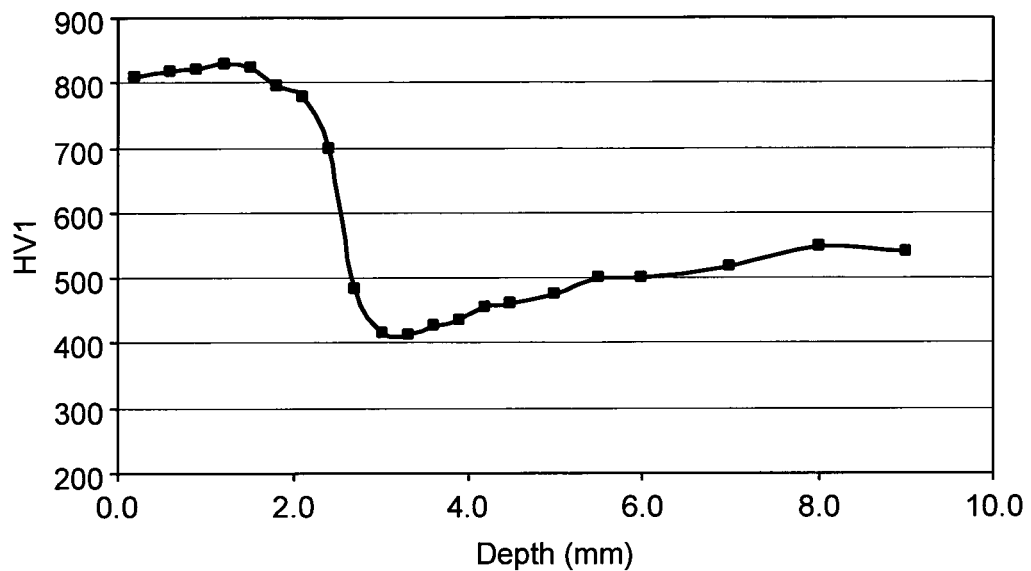
FIG. 7 is a plot showing the hardness profile for the component of Example 2 after the bainite through-hardening and induction heating steps.

FIG. 7 is a plot showing the hardness profile for the component of Example 2 after the bainite through-hardening and induction heating steps. The hardness profile shows a transition zone.

EXAMPLE 3

Martensite through Hardening and Post-Processing Under Interference Fit

Test component: Deep groove ball bearing (DGBB) inner ring with OD 62 mm formed from 100Cr6 steel Martensite through Hardening: Furnace rehardening using 860° C. and 20 min soaking time, followed by oil quenching in 60° C. oil and tempering at 160° C. for 60 min Post-processing: Mounting on over-sized shaft resulting in hoop-stress. Inductive surface heating using ~90 kHz to reach a surface temperature of ~940° C. and a case depth of ~1.8 mm, followed by quenching using a 5% Aquatensid polymer quench solution and tempering at 160° C. for 60 min. Removal of shaft.

Figure 8:
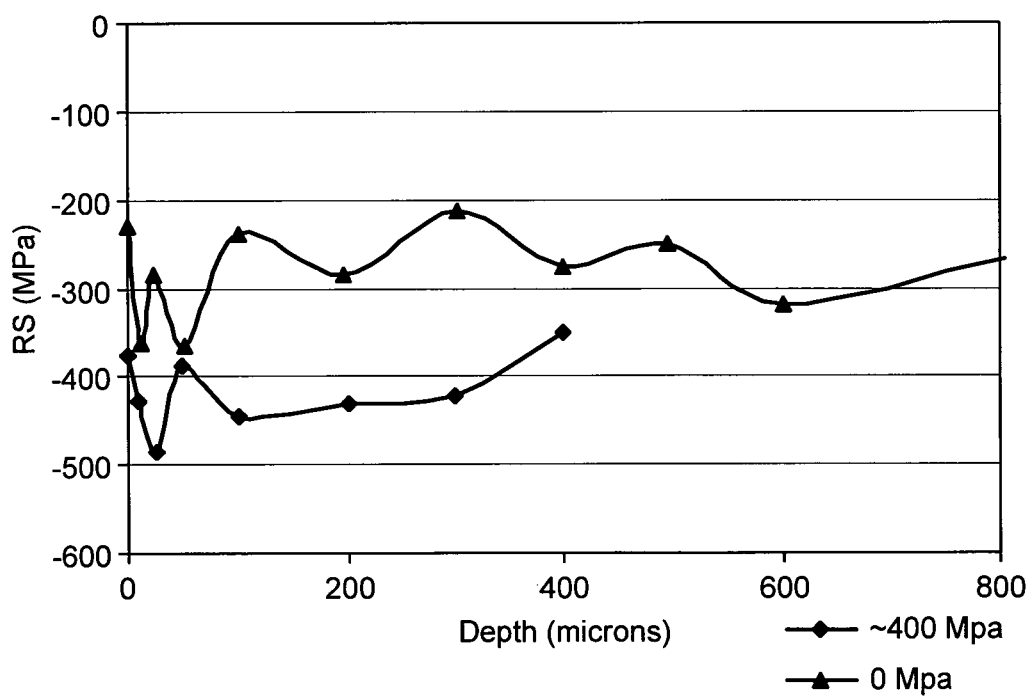
FIG. 8 is a plot showing the compressive residual stress profile for the component of Example 3 after the martensite through-hardening and induction heating steps.

FIG. 8 is a plot showing the CRS profile for the component of Example 3 after the martensite through-hardening and induction heating steps with different levels of hoop stress.

The invention claimed is:

1. A method of heat treating a steel bearing component, the method comprising:
   (i) induction heating at least a part of the steel bearing component followed by quenching at least said part of the steel bearing component, the induction heating causing the hardness of the steel bearing component to increase in a near surface region of up to 500 microns from an outer surface of the steel bearing component and generating a compressive residual stress of about −25 MPa to about −1000 MPa in the near surface region; and
   (ii) subsequently subjecting the steel bearing component to martensite through-hardening or bainite through-hardening so as to generate a microstructure in the steel bearing component that includes martensite and/or bainite.

2. The method of claim 1, wherein, in step (i), at least said part of the steel bearing component is induction heated to a depth of between 0.5 mm and 3 mm from the outer surface.

3. The method of claim 2, wherein, in step (i), the outer surface of the at least said part of the steel bearing component is induction heated to a temperature between 1000° C. and about 1100° C.

4. The method of claim 3, wherein the steel bearing component comprises at least 0.8 wt % C.

5. The method of claim 4, wherein the steel bearing component comprises up to 1.20 wt % C, 0.05-1.70 wt % Si, 1.1-2.2 wt % Cr, 0.10-1.0 wt % Mn, 0.02-1.0 wt % Ni, 0.02-0.70 wt % Mo, the balance being Fe and unavoidable impurities.

6. The method of claim 5, wherein the induction heating is performed at a frequency of between 2-100 kHz.

7. The method of claim 6, wherein the induction heating is performed at a frequency of between 5 and 20 kHz to a depth of 1-2 mm from the outer surface such that the outer surface reaches a temperature between 1020° C. and 1080° C.

8. The method of claim 7, wherein the steel bearing component is subjected to bainite through-hardening in step (ii) comprises:
  austenitising the steel bearing component at a temperature in the range of from 790° C. to about 840° C.,
  quenching the steel bearing component above its martensite start temperature, and
  subsequently performing an isothermal bainite transformation at a temperature between 210° C. and 240° C. until bainite comprises at least 50 vol % of the steel bearing component.

9. The method of claim 8, wherein the bainite through-hardening step is performed until the steel bearing component has a compressive residual stress profile between −200 MPa and −400 MPa at a depth of 0.5 mm to 1.0 mm below the outer surface.

10. The method of claim 9, wherein steps (i) and (ii) are performed such that the compressive residual stress of the steel bearing component is between −300 MPa and −800 MPa in the near surface region.

11. The method of claim 10, wherein the bainite through-hardening step is performed until the steel bearing component comprises at least 75 vol % bainite.

12. The method of claim 11, wherein the steel bearing component is an inner ring or an outer ring of a rolling element bearing.

13. The method of claim 12, wherein the bainite through-hardening step is performed until the compressive residual stress of the steel bearing component falls within a range of −200 to −400 MPa from 0.5 mm to 1.0 mm below the outer surface.

14. The method of claim 13, wherein the bainite through-hardening step is performed until the steel bearing component has a Vickers hardness within a range of 700-740 HV1 from the outer surface to a depth of 8.0 mm.

15. The method of claim 1, wherein the steel bearing component comprises 0.8-1.2 wt % C, 0.05-1.70 wt % Si, 1.1-2.2 wt % Cr, 0.10-1.0 wt % Mn, 0.02-1.0 wt % Ni, 0.02-0.70 wt % Mo, the balance being Fe and any unavoidable impurities.

16. The method of claim 1, wherein the induction heating is performed at a frequency of between 5 and 20 kHz to a depth of 1-2 mm from the outer surface such that the surface reaches a temperature between 1020° C. and 1080° C.

17. The method of claim 1, wherein the steel bearing component is subjected to bainite through-hardening in step (ii) comprises:
  austenitising the steel at a temperature in the range of from 790° C. to 840° C.,
  quenching the steel above the martensite start temperature, and
  subsequently performing an isothermal bainite transformation at a temperature between 210° C. and 240° C. until bainite comprises at least 50 vol% of the steel bearing component, the steel bearing component has a compressive residual stress profile between −200 MPa and −400 MPa at a depth of 0.5 mm to 1.0 mm below the outer surface, and the compressive residual stress of the steel bearing component is between −300 MPa and −800 MPa in the near surface region.

18. The method of claim 17, wherein the bainite through-hardening step is performed until the steel bearing component comprises at least 75 vol % bainite.

19. The method of claim 1, wherein the bainite through-hardening step is performed until the compressive residual stress of the steel bearing component falls within a range of −200 to −400 MPa from 0.5 mm to 1.0 mm below the outer surface.

20. The method of claim 1, wherein the bainite through-hardening step is performed until the steel bearing component has a core that comprises more than 50 vol % bainite, but its surface still comprises more than 50 vol % martensite generated in step (i).

21. The method of claim 1, wherein bainite through-hardening is performed in step (ii) and the bainite through-hardening step until the steel bearing component has a Vickers hardness less than 740 HV1 from the outer surface to a depth of 8.0 mm.

22. A method of heat treating a steel bearing ring, the method comprising:
  induction heating at least a part of an outer surface of the steel bearing ring followed by quenching at least said part of the steel bearing ring, the induction heating causing the hardness of the steel bearing ring to increase in a near surface region of up to 500 microns from an outer surface of the steel bearing ring and generating a compressive residual stress of −150 MPa to about −700 MPa in the near surface region,
  austenitising the steel bearing ring at a temperature in the range of from 790° C. to 840° C.,
  quenching the steel bearing ring above the martensite start temperature such that martensite is present in an amount of at least 75 vol% of the surface microstructure, and
  subsequently subjecting the steel bearing ring to isothermal bainite transformation so as to generate a microstructure in the steel bearing ring that includes at least 75 vol% bainite,
  wherein the isothermal bainite transformation step is performed until the compressive residual stress of the steel bearing ring is between −300 MPa and −800 MPa in the near surface region and at least −300 MPa up to at least 1.2 mm from the outer surface, the compressive residual stress of the steel bearing ring is between −300 to −400 MPa from 0.5 mm to 1.0 mm below the outer surface and the steel bearing ring has a Vickers hardness less than 740 HV1 from the outer surface to a depth of 8.0 mm,
  wherein, after the isothermal bainite transformation step, at least 50 vol % of the surface microstructure remains martensite, and
  wherein the steel bearing ring comprises 0.8-1.2 wt % C, 0.05-1.70 wt % Si, 1.1-2.2 wt % Cr, 0.10-1.0 wt % Mn, 0.02-1.0 wt % Ni, 0.02-0.70 wt % Mo, the balance being Fe and any unavoidable impurities.

23. The method of claim 22, wherein the induction heating is performed at a frequency of between 5 and 20 kHz to a depth of 1-2 mm from the outer surface such that the outer surface reaches a temperature between 1020° C. and 1080° C.

24. The method of claim 23, wherein the steel bearing ring is an inner ring of a rolling element bearing.

25. The method of claim 24, wherein the Vickers hardness of the steel bearing ring is greater than 700 HV1 from the outer surface to a depth of 8.0 mm.

26. The method of claim 22, wherein the Vickers hardness of the steel bearing ring is greater than 700 HV1 from the outer surface to a depth of 8.0 mm.

* * * * *